US010816712B2

(12) United States Patent
Mun et al.

(10) Patent No.: US 10,816,712 B2
(45) Date of Patent: Oct. 27, 2020

(54) OPTICAL FILM AND POLARIZATION PLATE COMPRISING THE SAME

(71) Applicant: LG Chem, Ltd., Seoul (KR)

(72) Inventors: Byoung Jun Mun, Daejeon (KR); Joong Hoon Lee, Daejeon (KR); Sung Ho Hwang, Daejeon (KR); Sei Jung Park, Daejeon (KR); Heon-Sik Song, Daejeon (KR)

(73) Assignee: LG Chem, Ltd. (KR)

( * ) Notice: Subject to any disclaimer, the term of this patent is extended or adjusted under 35 U.S.C. 154(b) by 161 days.

(21) Appl. No.: 16/073,480

(22) PCT Filed: May 29, 2017

(86) PCT No.: PCT/KR2017/005594
§ 371 (c)(1),
(2) Date: Jul. 27, 2018

(87) PCT Pub. No.: WO2017/222203
PCT Pub. Date: Jul. 27, 2018

(65) Prior Publication Data
US 2019/0025489 A1    Jan. 24, 2019

(30) Foreign Application Priority Data

Jun. 22, 2016 (KR) .................. 10-2016-0078225
May 26, 2017 (KR) .................. 10-2017-0065542

(51) Int. Cl.
| | |
|---|---|
| *G02B 5/30* | (2006.01) |
| *G02B 1/14* | (2015.01) |
| *B29D 11/00* | (2006.01) |
| *B29C 55/12* | (2006.01) |
| *C08J 5/18* | (2006.01) |
| *C08F 220/14* | (2006.01) |
| *B29C 55/00* | (2006.01) |
| *F21V 8/00* | (2006.01) |
| *C08L 33/12* | (2006.01) |
| *B29L 11/00* | (2006.01) |
| *B29K 33/00* | (2006.01) |

(52) U.S. Cl.
CPC .......... *G02B 5/3075* (2013.01); *B29C 55/005* (2013.01); *B29C 55/12* (2013.01); *B29D 11/00* (2013.01); *B29D 11/00788* (2013.01); *C08F 220/14* (2013.01); *C08J 5/18* (2013.01); *G02B 1/14* (2015.01); *G02B 5/30* (2013.01); *G02B 5/305* (2013.01); *G02B 6/0056* (2013.01); *B29D 11/0073* (2013.01); *B29D 11/00644* (2013.01); *B29K 2033/12* (2013.01); *B29L 2011/00* (2013.01); *C08J 2333/12* (2013.01); *C08L 33/12* (2013.01)

(58) Field of Classification Search
CPC .... G02B 5/3075; G02B 5/3083; B29C 55/12; B29D 11/00788; C08F 220/14

USPC ............... 359/352, 489.01, 489.13, 900
See application file for complete search history.

(56) References Cited

U.S. PATENT DOCUMENTS

| | | | | |
|---|---|---|---|---|
| 3,135,645 A | * | 6/1964 | Burkley | B32B 27/00 428/339 |
| 4,477,328 A | * | 10/1984 | Broeksema | B29C 35/0888 522/181 |
| 8,927,625 B2 | * | 1/2015 | Kim | C08F 265/06 523/171 |
| 2008/0281023 A1 | | 11/2008 | Numrich et al. | |
| 2009/0068484 A1 | | 3/2009 | Toshima | |
| 2010/0182689 A1 | | 7/2010 | Nakanishi et al. | |
| 2011/0308712 A1 | | 12/2011 | Takebe et al. | |
| 2014/0016196 A1 | | 1/2014 | Um et al. | |
| 2014/0036363 A1 | | 2/2014 | Seo et al. | |
| 2014/0071530 A1 | | 3/2014 | Park et al. | |
| 2014/0128547 A1 | | 5/2014 | Yonemura et al. | |
| 2014/0309395 A1 | | 10/2014 | Koike et al. | |
| 2014/0316090 A1 | | 10/2014 | Uchizawa et al. | |
| 2015/0183945 A1 | | 7/2015 | Shiraishi et al. | |
| 2015/0226884 A1 | | 8/2015 | Park et al. | |
| 2016/0146978 A1 | | 5/2016 | Lee et al. | |
| 2016/0245970 A1 | | 8/2016 | Um et al. | |
| 2016/0297939 A1 | | 10/2016 | Arita et al. | |
| 2017/0080689 A1 | | 3/2017 | Suda | |
| 2017/0173850 A1 | | 6/2017 | Zento et al. | |

FOREIGN PATENT DOCUMENTS

| | | |
|---|---|---|
| CN | 1768280 A | 5/2006 |
| CN | 102341732 A | 2/2012 |
| CN | 103347952 A | 10/2013 |
| CN | 103619946 A | 3/2014 |
| CN | 103703074 A | 4/2014 |
| CN | 105474054 A | 4/2016 |
| JP | 2002131540 A | 5/2002 |

(Continued)

OTHER PUBLICATIONS

Extended European Search Report including the Written Opinion for Application No. EP 17815616.2 dated Feb. 28, 2019.
International Search Report for Application No. PCT/KR2017/005594 dated Jul. 28, 2017.
Chinese Search Report for Application No. CN 201780012927.9 dated Mar. 20, 2020, 2 pages.

*Primary Examiner* — Ricky D Shafer

(74) *Attorney, Agent, or Firm* — Lerner, David, Littenberg, Krumholz & Mentlik, LLP

(57) ABSTRACT

The optical film according to the present invention uses polymethylmethacrylate that does not comprise cyclic monomers, but has excellent dimensional stability and optical properties, and thus, can be usefully used as a protection film of a polarization plate.

9 Claims, No Drawings

(56) References Cited

FOREIGN PATENT DOCUMENTS

| | | | |
|---|---|---|---|
| JP | 2006084712 | A | 3/2006 |
| JP | 2007334140 | A | 12/2007 |
| JP | 2008302570 | A | 12/2008 |
| JP | 2009292870 | A | 12/2009 |
| JP | 2010236085 | A | 10/2010 |
| JP | 2012082304 | A | 4/2012 |
| JP | 2012082358 | A | 4/2012 |
| JP | 5430187 | B2 | 2/2014 |
| JP | 2015143842 | A | 8/2015 |
| JP | 2016139105 | A | 8/2016 |
| KR | 101045184 | B1 | 6/2011 |
| KR | 20110126921 | A | 11/2011 |
| KR | 20120058773 | A | 6/2012 |
| KR | 101175425 | B1 | 8/2012 |
| KR | 20130037165 | A | 4/2013 |
| KR | 101348008 | B1 | 2/2014 |
| KR | 20140099511 | A | 8/2014 |
| KR | 20140106515 | A | 9/2014 |
| KR | 20140142766 | A | 12/2014 |
| KR | 20140142821 | A | 12/2014 |
| KR | 20150039089 | A | 4/2015 |
| KR | 101533883 | B1 | 7/2015 |
| KR | 20160062901 | A | 6/2016 |
| TW | 201425357 | A | 7/2014 |
| TW | 201546133 | A | 12/2015 |
| WO | 2007108314 | A1 | 9/2007 |
| WO | 2015047005 | A1 | 4/2015 |
| WO | 2015098676 | A1 | 7/2015 |
| WO | 2015182614 | A1 | 12/2015 |

* cited by examiner

OPTICAL FILM AND POLARIZATION PLATE COMPRISING THE SAME

CROSS-REFERENCE TO RELATED APPLICATIONS

The present application is a national phase entry under 35 U.S.C. § 371 of International Application No. PCT/KR2017/005594 filed May 29, 2017, which claims priority from Korean Patent Application No. 10-2016-0078225 filed Jun. 22, 2016 and Korean Patent Application No. 10-2017-0065542 filed May 26, 2017, all of which are incorporated herein by reference.

TECHNICAL FIELD

The present invention relates to an optical film that uses polymethylmethacrylate which does not comprise cyclic monomers, but has excellent dimensional stability and optical properties, and thus, can be usefully used as a protection film of a polarization plate, and a polarization film comprising the same.

BACKGROUND OF ART

A liquid crystal display device uses polarized light, and a polarization plate, representatively a PVA device is used for this purpose. However, since a polarization plate such as a PVA device has weak mechanical properties and is easily influenced by external environment, for example, temperature or humidity, a protection film is required.

Such a protection film should have excellent optical properties and excellent mechanical properties. As the protection film of a PVA device used in a polarization plate, a TAC film (tri-acetyl-cellulose film) has been conventionally used, but recently, an acryl-based film having more excellent heat resistance and absorption resistance than the TAC film is being used.

The acryl-based film for protecting a polarization plate is manufactured through extrusion casting and drawing, and in general, acryl-based resin having a glass transition temperature of 120° C. or more is used so that dimensional change may be small and optical property may be stably maintained at high temperature. Further, in order to further improve dimensional stability and optical property of the acryl-based resin, cyclic monomers giving heat resistance are introduced. However, cyclic monomers are introduced, cost of raw materials may increase, and higher temperature should be used for processing, and thus, end groups of polymer may be decomposed or low molecular weight additives may be thermally decomposed.

Meanwhile, although polymethylmethacrylate (PMMA) has excellent transparency and thus has the possibility of being used as a protection film for a polarization plate, the glass transition temperature is low, and thus, when used at high temperature, dimensional stability may be deteriorated. If drawing is conducted at relatively high temperature so as to compensate for such disadvantages, the dimensional stability of the drawn film at high temperature may increase, but the properties of the film such as strength, etc. may be deteriorated due to the high drawing temperature. Further, low molecular weight additives added to the film may move to the surface of the film, and thus, adhesion of the film may be deteriorated and yield may decrease due to appearance defect.

Therefore, as the result of a lot of efforts to prepare an optical film, particularly, a protection film for a polarization plate that uses polymethylmethacrylate which does not comprise cyclic monomers, but has excellent dimensional stability and optical properties, the present inventors confirmed that the above object can be achieved by using polymethylmethacrylate comprising a specific amount of methyl acrylate monomers and having a specific weight average molecular weight, under appropriate drawing conditions, and completed the present invention.

DETAILED DESCRIPTION OF THE INVENTION

Technical Problem

It is an object of the present invention to provide an optical film having excellent dimensional stability and optical properties.

It is another object of the present invention to provide polarization plate comprising the above described optical film.

Technical Solution

In order to solve the problems, the present invention provides an optical film comprising polymethylmethacrylate, wherein the polymethylmethacrylate comprises methyl acrylate monomers in the content of 1 to 5 wt %, the weight average molecular weight of the polymethylmethacrylate is 120,000 to 160,000, and temperatures (TTS) at which the optical film begins to shrink after expanded to the MD direction and TD direction of the optical film, as a temperature increases, are 100° C. to 120° C., respectively.

Polymethylmethacrylate (PMMA) has excellent transparency, and thus, can be used as an optical film, particularly a protection film for a polarization plate. However, in case polymethylmethacrylate is manufactured into a film, a drawing process should be used so as to increase mechanical strength, but since polymethylmethacrylate has low glass transition temperature, the dimensional stability of an optical film manufactured using the same may be deteriorated due to relaxation of draw history at high temperature.

In order to evaluate thermal dimensional stability of the optical film, a variable of TTS (Temperature of Thermal Shrinkage) was introduced, which means a temperature at which the draw history of an optical film manufactured by a drawing process is relaxed and the film begins to rapidly shrink. Specifically, it means a temperature at which an optical film begins to shrink after expanded as a temperature increases, when the optical film is heated.

Previously, in order to improve thermal dimensional stability of polymethylmethacrylate, a method of introducing a cyclic structure into polymethylmethacrylate was used, but the preparation process was complicated, the cost of raw materials increased, and higher processing temperature should be used. However, in the present invention, it was confirmed that in case polymethylmethacrylate comprises non-cyclic methyl acrylate monomers in the content of 1 to 5 wt %, the weight average molecular weight of the polymethylmethacrylate is 120,000 to 160,000, and drawing of the polymethylmethacrylate is conducted under the conditions described below, TTS of the optical film manufactured using the same is 100° C. to 120° C., which is excellent for an optical film.

Hereinafter, the present invention will be explained in detail.

As used herein, "poly(methyl methacrylate(PMMA)" means polymer including methyl methacrylate(MMA) as monomers, and particularly, in the present invention, it means polymer comprising 1 to 5 wt % of methyl acrylate monomers at the end. The methyl acrylate functions for inhibiting decomposition of copolymer and controlling a glass transition temperature, and it also has an influence on the property of TTS. Further, since the polymethylmethacrylate does not use cyclic monomers, it does not have a cyclic structure in the chemical structure of the polymer. Preferably, the polymethylmethacrylate comprise methyl acrylate monomers in the content of 1.5 wt % or more, or 2.0 wt % or more; and 4.5 wt % or less, 4.0 wt % or less, 3.5 wt % or less, or 3.0 wt % or less.

The polymethylmethacrylate may be prepared by the known methods except using methyl acrylate in addition to methyl methacrylate, and for example, it may be prepared by an emulsion polymerization method, an emulsion-suspension polymerization method, a suspension polymerization method, etc. Further, in order to introduce methyl acrylate monomers at the end of polymethylmethacrylate, methyl acrylate monomers may be polymerized after polymerizing polymethylmethacrylate first.

Further, the weight average molecular weight of the polymethylmethacrylate may be 120,000 to 160,000, more preferably 110,000 to 140,000. If the weight average molecular weight is less than 120,000, when manufactured into an optical film, the mechanical properties may be deteriorated, and if it is greater than 160,000, melt extrusion may be difficult.

Further, the glass transition temperature of the polymethylmethacrylate may be preferably 100° C. to 120° C. If the glass transition temperature is less than 100° C., when manufactured into an optical film, the thermal dimensional stability may be deteriorated. More preferably, the glass transition temperature of the polymethylmethacrylate may be 101° C. or more, 102° C. or more, 103° C. or more, 104° C. or more, 105° C. or more, 106° C. or more, 107° C. or more, 108° C. or more, 109° C. or more, or 110° C. or more; and 119° C. or less, 118° C. or less, 117° C. or less, or 116° C. or less.

Further, the polymethylmethacrylate resin composition may further comprise various additives commonly used in the art, for example, an antioxidant, an UV absorber, a heat stabilizer, etc. as necessary. Here, the additives should be included in an appropriate content within a range that does not damage the properties of an optical film manufactured through drawing, and it is preferable that low molecular weight additives with a molecular weight of 2,000 or less are included in the content of 2 wt % or less, based on 100 wt % of the resin composition.

As used herein, the term "optical film" means a film manufactured by drawing the above explained polymethylmethacrylate.

Particularly, the optical film according to the present invention is prepared by the preparation method comprising the step of biaxially drawing the above explained polymethylmethacrylate 1.5 times to 2.5 times to the MD direction and 1.5 times to 3.5 times to the TD direction, The drawing is to arrange the molecule of the polymethylmethacrylate, and has an influence on the properties of an optical film manufactured, according to the degree of drawing. More preferably, the polymethylmethacrylate is drawn to the MD direction 1.6 times or more, or 1.7 times or more; and 2.4 times or less, 2.3 times or less, 2.2 times or less, 2.1 times or less, or 2.0 times or less. Further, more preferably, the polymethylmethacrylate is drawn to the TD direction 2.0 times or more, 2.1 times or more, 2.2 times or more, 2.3 times or more, or 2.4 times or more; and 3.4 times or less, 3.3 times or less, 3.2 times or less, or 3.1 times or less.

Thus, in the present invention, by drawing under the above explained conditions, excellent thermal dimensional stability of an optical film is exhibited, i.e., TTS of an optical film is 100° C. to 120° C. More preferably, in the optical film according to the present invention, when biaxially drawing the above explained polymethylmethacrylate to the MD direction and TD direction, the ratio of the draw ratio to the TD direction and the draw ratio to the MD direction (TD draw ratio/MD draw ratio) is 1.05 or more and 1.70 or less. More preferably, the ratio of the draw ratio to the TD direction and the draw ratio to the MD direction (TD draw ratio/MD draw ratio) is 1.1 or more and 1.7 or less, 1.2 or more and 1.7 or less, or 1.3 or more and 1.7 or less.

Further, it is preferable that the drawing is conducted at a temperature 10° C. to 30° C. higher than the glass transition temperature of the polymethylmethacrylate. More preferably, the drawing is conducted at a temperature 11° C. to 29° C. higher, 12° C. to 28° C. higher, 13° C. to 27° C. higher, 14° C. to 26° C. higher, or 15° C. to 25° C. higher than the glass transition temperature of the polymethylmethacrylate.

Further, the weight average molecular weight of the optical film tends to be slightly lower than that of the polymethylmethacrylate resin, and it may decrease by 0.1 to 3% based on the weight average molecular weight. For example, in case the weight average molecular weight of polymethylmethacrylate is 130,000, the weight average molecular weight of the optical film after extrusion and drawing was 128,000 and thus decreased by about 1.7%.

The TTS values of the MD direction and the TD direction of the optical film according to the present invention are 100° C. to 120° C., respectively. TTS (Temperature of Thermal Shrinkage) means a temperature at which drawing of an optical film manufactured by a drawing process relaxes and the film begins to rapidly shrink, and it may be measured to the MD direction and TD direction, which are drawing directions. As in the examples described below, an optical film of 80×4.5 mm is heated under atmospheric condition using a TMA measuring device, to expand the film to the MD direction and TD direction, respectively, and then, a temperature at which the film begins to shrink is determined as the TTS value.

Preferably, the TTS value of the MD direction of the optical film according to the present invention is 101° C. or more, 102° C. or more, 103° C. or more, or 104° C. or more; and 115° C. or less, 114° C. or less, 113° C. or less, 112° C. or less, 111° C. or less, or 110° C. or less. Further, preferably, the TTS value of the TD direction of the optical film according to the present invention is 101° C. or more, 102° C. or more, or 103° C. or more; and 115° C. or less, 114° C. or less, 113° C. or less, 112° C. or less, 111° C. or less, or 110° C. or less.

Preferably, the optical film according to the present invention has a difference between TTS of the MD direction and TTS of the TD direction is 10° C. or less. If the difference is greater than 10° C., the anisotropy of the optical film may be high, which is not preferable for an optical film. Also, it means that, by drawing, the orientation of the polymer chain is not balanced to the MD and TD direction but is biased to one direction, and thus, it is not preferable in terms of the properties of the optical film. More preferably, the difference between TTS of the MD direction and TTS of the TD direction is 9° C. or less, 8° C. or less, 7° C. or less, or 6° C. or less.

Further, preferably, differences between the glass transition temperature of the polymethylmethacrylate, and TTS of the MD direction and TTS of the TD direction are 15° C. or less, respectively. If the difference is greater than 15° C., TTS value may be too low, and thus, dimensional change such as shrinkage of the film may seriously occur in the durability evaluation temperature range of high temperature, which is not preferable. More preferably, the difference between the glass transition temperature of the polymethylmethacrylate, and TTS of the MD direction is 14° C. or less, 13° C. or less, 12° C. or less, 11 ° C. or less, or 10° C. or less. Further, more preferably, the difference between the glass transition temperature of the polymethylmethacrylate, and TTS of the TD direction is 14° C. or less, 13° C. or less, or 12° C. or less. As each difference is smaller, TTS comes close to the glass transition temperature of polymethylmethacrylate, and thus, high temperature durability is improved.

Meanwhile, the thickness of the optical film according to the present invention may be appropriately controlled, as necessary, and for example, it is preferably 10 um to 200 um. Further, the optical film according to the present invention may comprise an antioxidant, an UV absorber, a heat stabilizer, etc., as necessary. Particularly, the optical film according to the present invention may comprise an UV absorber, and the UV transmittance at a wavelength of 380 nm may be greater than 0% and 20% or less.

Further, the present invention provides a polarization plate comprising the above described optical film. As explained above, the optical film according to the present invention may be used as a protection film of a polarization plate, thereby supplementing the mechanical properties of the polarization plate, and protecting the polarization plate from the influence of temperature and humidity, for example.

Advantageous Effects

As explained above, the optical film according to the present invention uses polymethylmethacrylate that does not comprise cyclic monomers, but has excellent dimensional stability and optical properties, and thus, can be usefully used as a protection film of a polarization plate.

DETAILED DESCRIPTION OF THE EMBODIMENTS

Hereinafter, preferable examples are presented to complete the understanding of the present invention. However, these examples are presented only for better understanding of the present invention, and the present invention is not limited thereby.

Example 1

Into a 5 liter reactor, 1000 g of a monomer mixture of 97.5 wt % of methyl methacrylate and 2.5 wt % of methyl acrylate was put, and 2000 g of distilled water, 8.4 g of a 5% polyvinyl alcohol solution (POVAL PVA217, kuraray Company), and 0.1 g of boric acid as a dispersion aid were introduced and dissolved. Further, 2.5 g of n-octylmercaptane as a chain transfer agent, and 1.5 g of 2,2'-azobisisobutyronitrile as a polymerization initiator were introduced therein, and the mixture was dispersed in an aqueous phase while stirring at 400 rpm to prepare a suspension. The temperature was raised to 80° C. and polymerization was conducted for 90 minutes, followed by cooling to 30° C. The obtained bead was washed with distilled water, dehydrated and dried to prepare polymethylmethacrylate resin.

As the result of measuring the glass transition temperature and molecular weight of the prepared resin, the glass transition temperature was 115° C., and the weight average molecular weight was 120,000. Further, 1.5 wt % (based on the solid content) of an UV absorber (Tinuvin 360, BASF Corporation), and 1.5 wt % (based on the solid content) of an antioxidant (Irganox 1010, BASF Corporation) were compounded with the resin to prepare the final resin composition. It was molten at 265° C. and extrusion-casted to a sheet shape through a T-Die, and then, biaxially drawn 1.8 times to the MD direction and 2.5 time to the TD direction at 130° C., which is Tg+15° C., thus preparing an optical film.

Example 2

An optical film was manufactured by the same method as Example 1, except biaxially drawing 1.8 times to the MD direction and 3.0 times to the TD direction.

Example 3

An optical film was manufactured by the same method as Example 1, except biaxially drawing 1.8 times to the MD direction and 2.5 times to the TD direction at 135° C., which is Tg+20° C.

Example 4

An optical film was manufactured by the same method as Example 1, except biaxially drawing 1.8 times to the MD direction and 3.0 times to the TD direction at 135° C., which is Tg+20° C.

Comparative Example 1

An optical film was manufactured by the same method as Example 1, except biaxially drawing 1.8 times to the MD direction and 2.5 times to the TD direction at 125° C., which is Tg+10° C.

Comparative Example 2

An optical film was manufactured by the same method as Example 1, except biaxially drawing 1.8 times to the MD direction and 3.0 times to the TD direction at 125° C., which is Tg+10° C.

Comparative Example 3

Into a 5 liter reactor, 1000 g of a monomer mixture of 89.0 wt % of methyl methacrylate and 11.0 wt % of methyl acrylate was put, and 2000 g of distilled water, 8.4 g of a 5% polyvinyl alcohol solution (POVAL PVA217, kuraray Company), and 0.1 g of boric acid as a dispersion aid were introduced and dissolved. Further, 2.5 g of n-octylmercaptane as a chain transfer agent, and 1.5 g of 2,2'-azobisisobutyronitrile as a polymerization initiator were introduced therein, and the mixture was dispersed in an aqueous phase while stirring at 400 rpm to prepare a suspension. The temperature was raised to 80° C. and polymerization was conducted for 90 minutes, followed by cooling to 30° C. The obtained bead was washed with distilled water, dehydrated and dried to prepare polymethylmethacrylate resin.

As the result of measuring the glass transition temperature and molecular weight of the prepared resin, the glass transition temperature was 99° C., and the weight average molecular weight was 95,000. Further, 1.5 wt % (based on the solid content) of an UV absorber (Tinuvin 360, BASF Corporation), and 1.5 wt % (based on the solid content) of an antioxidant (Irganox 1010, BASF Corporation) were compounded with the resin to prepare the final resin composition. It was molten at 265° C. and extrusion-casted to a sheet shape through a T-Die, and then, biaxially drawn 1.8 times to the MD direction and 2.5 time to the TD direction at 119° C., which is Tg+20 ° C., thus preparing an optical film.

Comparative Example 4

An optical film was manufactured by the same method as Comparative Example 3, except biaxially drawing 1.8 times to the MD direction and 3.0 times to the TD direction Comparative Example 5

An optical film was manufactured by the same method as Example 1, except biaxially drawing 2.2 times to the MD direction and 2.2 times to the TD direction at 120° C., which is Tg+5° C.

Comparative Example 6

An optical film was manufactured by the same method as Example 1, except biaxially drawing 2.2 times to the MD direction and 2.2 times to the TD direction at 115° C., which is Tg.

Comparative Example 7

Into a 5 liter reactor, 1000 g of a monomer mixture of 95 wt % of methyl methacrylate and 5 wt % of methyl acrylate was put, and 2000 g of distilled water, 8.4 g of a 5% polyvinyl alcohol solution (POVAL PVA217, kuraray Company), and 0.1 g of boric acid as a dispersion aid were introduced and dissolved. Further, 2.5 g of n-octylmercaptane as a chain transfer agent, and 1.5 g of 2,2'-azobisisobutyronitrile as a polymerization initiator were introduced therein, and the mixture was dispersed in an aqueous phase while stirring at 400 rpm to prepare a suspension. The temperature was raised to 80° C. and polymerization was conducted for 90 minutes, followed by cooling to 30° C. The obtained bead was washed with distilled water, dehydrated and dried to prepare polymethylmethacrylate resin.

As the result of measuring the glass transition temperature and molecular weight of the prepared resin, the glass transition temperature was 110° C., and the weight average molecular weight was 120,000. Further, 1.5 wt % (based on the solid content) of an UV absorber (Tinuvin 360, BASF Corporation), and 1.5 wt % (based on the solid content) of an antioxidant (Irganox 1010, BASF Corporation) were compounded with the resin to prepare the final resin composition. It was molten at 265° C. and extrusion-casted to a sheet shape through a T-Die, and then, biaxially drawn 2.4 times to the MD direction and 2.4 time to the TD direction at 115° C., which is Tg+5 ° C., thus preparing an optical film.

Experimental Example

Using the optical films manufactured in Examples and Comparative Examples, the properties were measured as follows.

1) TTS (Temperature of Thermal Shrinkage): The optical films were manufactured into samples of 80×4.5 mm, which were measured using a TA TMA(Q400) equipment. Specifically, a temperature of inflection point (the gradient of a tangent line is 0) at which the sample begins to shrink after expanded to the MD and TD directions, respectively, when the sample was heated at a temperature rise speed of 10 ° C./min and a load of 0.02 N under atmospheric condition, was determined as TTS.

2) dimensional change(MD/TD): The optical films were manufactured into a samples of 20×200 mm, which were stayed in an oven of 85° C. for 100 hours, and then, the changed length to the initial length was measured. The percentage value of the changed length to the initial length was determined as the dimensional change value.

3) POL Bending (MD/TD): A polarization plate was manufactured with the optical film as a protection film of a PVA polarizer, and a COP film as a protection film on the opposite side. The polarization plate was cut to 140×20 mm to the MD and TD directions, and then, PSA was laminated on the COP protection film side, and the COP protection film side was laminated to 0.7 t glass of 150×30 mm. The polarization plate laminated to glass was stayed in an oven of 80° C. for 24 hours, and then, aged at room temperature for 24 hours. Thereafter, one side of bended polarization plate was fixed to the ground, and then, the height of the other side of lifted polarization plate was measured, which was determined as a Pol Bending value.

The results are shown in the following Table 1.

TABLE 1

| | Unit | Tg °C. | Drawing temperature °C. | Draw ratio (MD × TD) — | TTS (MD/TD) °C./°C. | [Tg-TTS] (MD/TD) °C./°C. | Dimensional change (MD/TD) %/% | Pol Bending (MD/TD) mm/mm |
|---|---|---|---|---|---|---|---|---|
| Example 1 | | 115 | 130 | 1.8 × 2.5 | 104/103 | 11/12 | −0.52/−0.63 | 0.75/0.4 |
| Example 2 | | 115 | 130 | 1.8 × 3.0 | 106/100 | 9/15 | −0.45/−0.85 | 0.66/0.48 |
| Example 3 | | 115 | 135 | 1.8 × 2.5 | 106/105 | 9/10 | −0.42/−0.52 | 0.63/0.37 |
| Example 4 | | 115 | 135 | 1.8 × 3.0 | 108/103 | 7/12 | −0.37/−0.61 | 0.6/0.39 |
| Comparative Example 1 | | 115 | 125 | 1.8 × 2.5 | 99/98 | 16/17 | −0.74/−0.94 | 1.05/0.55 |
| Comparative Example 2 | | 115 | 125 | 1.8 × 3.0 | 102/96 | 13/19 | −0.74/−0.94 | 0.8/0.61 |
| Comparative Example 3 | | 99 | 119 | 1.8 × 2.5 | 93/92 | 6/7 | −0.57/−1.06 | 1.31/0.73 |
| Comparative Example 4 | | 99 | 119 | 1.8 × 3.0 | 95/90 | 4/9 | −1.03/−1.32 | 1.25/0.77 |
| Comparative Example 5 | | 115 | 120 | 2.2 × 2.2 | 99/108 | 16/7 | — | — |
| Comparative Example 6 | | 115 | 115 | 2.2 × 2.2 | 96/105 | 19/10 | — | — |

TABLE 1-continued

| Unit | Tg °C. | Drawing temperature °C. | Draw ratio (MD × TD) — | TTS (MD/TD) °C./°C. | [Tg-TTS] (MD/TD) °C./°C. | Dimensional change (MD/TD) %/% | Pol Bending (MD/TD) mm/mm |
|---|---|---|---|---|---|---|---|
| Comparative Example 7 | 110 | 115 | 2.4 × 2.4 | 93/99 | 17/11 | — | — |

Comparing Example 1 and Comparative Example 1, it is confirmed that as the drawing temperature is higher, higher TTS is exhibited, and optical films with less dimensional change can be prepared, thus preparing a polarization plate with less bending. Comparisons of Example 2 and Comparative Example 2, Example 3 and Comparative Example 3, and Example 4 and Comparative Example 4 also show the same tendencies.

The invention claimed is:

1. An optical film comprising polymethylmethacrylate, wherein the polymethylmethacrylate comprises methyl acrylate monomers in a content of 1 to 5 wt %, the polymethylmethacrylate has a weight average molecular weight of 120,000 to 160,000, and a temperatures (TTS) at which the optical film begins to shrink after expanded to machine direction (MD direction) and transverse direction (TD direction) is 100° C. to 120° C., respectively.

2. The optical film according to claim 1, wherein the polymethylmethacrylate has a glass transition temperature of 100° C. to 120° C.

3. The optical film according to claim 1, wherein the TTS of the MD direction and the TTS of the TD direction has a difference of 10° C. or less.

4. The optical film according to claim 1, wherein a glass transition temperature of the polymetylmethacrylate, and the TTS of the MD direction and the TTS of the TD direction has a difference of 15° C. or less, respectively.

5. The optical film according to claim 1, further comprising an UV absorber, wherein the optical film has a UV transmittance at a wavelength of 380 nm of greater than 0% and 20% or less.

6. A method for preparing the optical film according to claim 1, comprising a step of biaxially drawing the polymethylmethacrylate 1.5 times to 2.5 times to the MD direction and 1.5 times to 3.5 times to the TD direction.

7. The method according to claim 6, wherein a ratio of a draw ratio of the TD direction and a draw ratio of the MD direction (TD draw ratio/MD draw ratio) is 1.05 or more and 1.70 or less.

8. The method according to claim 6, wherein the drawing is conducted at a temperature 10° C. to 30° C. higher than a glass transition temperature of the polymetylmethacrylate.

9. A polarization plate comprising the optical film according to claim 1.

* * * * *